United States Patent
Sodeyama et al.

(10) Patent No.: US 9,303,361 B2
(45) Date of Patent: Apr. 5, 2016

(54) METHOD FOR PRODUCING CATIONIC SURFACE SIZING AGENT, AND SIZING AGENT OBTAINED BY METHOD

(75) Inventors: Takuji Sodeyama, Kakogawa (JP); Yoko Hayashi, Kakogawa (JP); Kazushige Inaoka, Kakogawa (JP)

(73) Assignee: HARIMA CHEMICALS, INC., Hyogo (JP)

( * ) Notice: Subject to any disclaimer, the term of this patent is extended or adjusted under 35 U.S.C. 154(b) by 378 days.

(21) Appl. No.: 14/007,917

(22) PCT Filed: Aug. 18, 2011

(86) PCT No.: PCT/JP2011/068671
§ 371 (c)(1),
(2), (4) Date: Sep. 26, 2013

(87) PCT Pub. No.: WO2012/132044
PCT Pub. Date: Oct. 4, 2012

(65) Prior Publication Data
US 2014/0017505 A1     Jan. 16, 2014

(30) Foreign Application Priority Data

Mar. 29, 2011 (JP) ................................ 2011-071458

(51) Int. Cl.
| | |
|---|---|
| *D21H 21/16* | (2006.01) |
| *C09D 133/14* | (2006.01) |
| *D21H 17/37* | (2006.01) |
| *D21H 17/45* | (2006.01) |
| *D21H 19/20* | (2006.01) |
| *D21H 17/35* | (2006.01) |
| *D21H 21/52* | (2006.01) |

(52) U.S. Cl.
CPC .............. *D21H 21/16* (2013.01); *C09D 133/14* (2013.01); *D21H 17/35* (2013.01); *D21H 17/37* (2013.01); *D21H 17/375* (2013.01); *D21H 17/455* (2013.01); *D21H 19/20* (2013.01); *D21H 21/52* (2013.01); *Y10T 428/31906* (2015.04)

(58) Field of Classification Search
CPC ..... C09D 133/14; D21H 17/35; D21H 17/37; D21H 17/375; D21H 17/455; D21H 19/20; D21H 21/16; D21H 21/52; Y10T 428/31906
USPC .......................... 525/329.7; 428/514; 524/523
See application file for complete search history.

(56) References Cited

U.S. PATENT DOCUMENTS

| 6,426,381 B1 | 7/2002 | Konig et al. |
|---|---|---|
| 2002/0040088 A1 | 4/2002 | Hauschel et al. |
| 2008/0039598 A1 | 2/2008 | Kukula et al. |
| 2009/0272507 A1 | 11/2009 | Inaoka et al. |

FOREIGN PATENT DOCUMENTS

| CN | 101400853 A | 4/2009 | |
|---|---|---|---|
| EP | 1 180 527 A1 | 2/2002 | |
| JP | 57-101098 A | 6/1982 | |
| JP | 58-115195 A | 7/1983 | |
| JP | 11-256496 A | 9/1999 | |
| JP | 11-279983 A | 10/1999 | |
| JP | 2001-262495 | * 9/2001 | ............... C08F 3/30 |
| JP | 2001-262495 A | 9/2001 | |
| JP | 2002-504563 A | 2/2002 | |
| JP | 2002-129494 A | 5/2002 | |
| JP | 2006-016712 A | 1/2006 | |
| JP | 2006-161259 A | 6/2006 | |
| JP | 2006-322093 A | 11/2006 | |
| JP | 2007-197866 A | 8/2007 | |
| JP | 2008-501830 A | 1/2008 | |
| JP | 2009-242686 A | 10/2009 | |

OTHER PUBLICATIONS

First Office Action dated Jan. 30, 2015 from the State Intellectual Property Office of the People's Republic of China in counterpart application No. 201180069628.1.
International Search Report for PCT/JP2011/068671 dated Nov. 8, 2011.

* cited by examiner

*Primary Examiner* — Bijan Ahvazi
*Assistant Examiner* — Chun-Cheng Wang
(74) *Attorney, Agent, or Firm* — Sughrue Mion, PLLC

(57) ABSTRACT

The present invention relates to a method for producing a cationic surface sizing agent, and contains a first step of obtaining a copolymer (A) by solution-polymerizing a monomer mixture which contains a monomer having a tertiary amino group (a) in the amount of 15 to 45% by weight, a (meth)acrylic acid ester (b) in the amount of 15 to 85% by weight, and styrenes (c) in the amount of 0 to 70% by weight in the presence of a chain transfer agent; a second step of obtaining a copolymer (B) by polymerizing the copolymer (A) and a nonionic hydrophilic monomer (d); a third step of obtaining a copolymer (C) by polymerizing the copolymer (B) and a hydrophobic monomer (e) in the absence of a surfactant; and a fourth step of obtaining a quaternary ammonium salt of the copolymer (C) by quaternizing a tertiary amino group present in the copolymer (C).

16 Claims, No Drawings

METHOD FOR PRODUCING CATIONIC SURFACE SIZING AGENT, AND SIZING AGENT OBTAINED BY METHOD

CROSS REFERENCE TO RELATED APPLICATIONS

This application is a National Stage of International Application No. PCT/JP2011/068671 filed Aug. 18, 2011, claiming priority based on Japanese Patent Application No. 2011-071458 filed Mar. 29, 2011, the contents of all of which are incorporated herein by reference in their entirety.

TECHNICAL FIELD

The present invention relates to a method for producing a cationic surface sizing agent, a sizing agent obtained by the method, and paper and a paper board coated with the sizing agent.

BACKGROUND ART

Conventional cationic surface sizing agents usually contain styrenes and a monomer having a tertiary amino group (i.e., a cationic monomer) as a main component. The sizing agent is an aqueous solution of a copolymer having a tertiary amino group obtained by polymerizing the monomer component, or a copolymer having a quaternary ammonium salt group obtained by quaternizing the tertiary amino group (Patent Documents 1 and 2). These copolymers are prepared by the following method.
(i) Solution-polymerization using an oil-soluble polymerization catalyst is performed in an organic solvent or a mixed solvent of an organic solvent and water.
(ii) Emulsion polymerization using a water-soluble polymerization catalyst is performed in a water-based solvent.

The cationic surface sizing agent obtained by such a method has a good sizing property, but has a problem that it is susceptible to environment of usage, especially influences of water (hardness, pH, etc.) and its stability is insufficient.

Further, as the cationic surface sizing agent obtained by polymerization in a solution, a sizing agent using a water-soluble polymer in combination is known (Patent Document 3). However, as with the surface sizing agent described in Patent Documents 1 and 2, this surface sizing agent has a good sizing property, but it is susceptible to environment of usage, especially influences of water (hardness, pH, etc.) and its stability is insufficient.

On the other hand, in the cationic surface sizing agent obtained by performing emulsion polymerization in water without using an organic solvent, or in the cationic surface sizing agent obtained by performing emulsion polymerization of a cationic polymer obtained by solution-polymerization and a hydrophobic monomer, a surfactant is often used as an emulsifier (Patent Documents 4 to 8). An emulsion polymerization product using the surfactant is less susceptible to an impact of environment of usage than the cationic surface sizing agent obtained by the solution-polymerization, and an improvement in stability can be expected, but the improvement effect is not adequate. Furthermore, such emulsion polymerization product is inferior in the effect of imparting a sizing property to the cationic surface sizing agent obtained by the solution-polymerization because of use of a surfactant.

Further, a production method in which emulsion polymerization is performed without using the surfactant is known (Patent Documents 9 and 10). In the cationic surface sizing agent obtained without using the surfactant, an aqueous solution of a cationic polymer obtained by solution-polymerization is used as a dispersing agent. Hence, the cationic surface sizing agent exhibits the stability equal to and the sizing property higher than the sizing agent using the surfactant. However, the cationic surface sizing agent obtained by the emulsion polymerization is inferior in the effect of imparting a sizing property to the cationic surface sizing agent obtained by the solution-polymerization.

PRIOR ART DOCUMENTS

Patent Documents

Patent Document 1: Japanese Unexamined Patent Publication No. 2006-161259
Patent Document 2: Japanese Unexamined Patent Publication No. 2006-322093
Patent Document 3: Japanese Unexamined Patent Publication No. 2007-197866
Patent Document 4: Japanese Unexamined Patent Publication No. 11-256496
Patent Document 5: Japanese Unexamined Patent Publication No. 11-279983
Patent Document 6: Japanese Unexamined Patent Publication No. 2001-262495
Patent Document 7: Japanese Unexamined Patent Publication No. 2006-016712
Patent Document 8: Japanese Unexamined Patent Publication No. 2009-242686
Patent Document 9: Japanese Unexamined Patent Publication No. 2002-129494
Patent Document 10: Japanese Unexamined Patent Publication No. 2008-501830

SUMMARY OF THE INVENTION

Problems to be Solved by the Invention

It is an object of the present invention to provide a cationic surface sizing agent which has excellent dispersion stability and imparts an excellent sizing property regardless of environment of usage, especially water conditions (hardness, pH, etc.) or paper types (paper, paper board, etc.) to which the sizing agent is applied.

Solutions to the Problems

The present inventors made earnest investigations in order to solve the above-mentioned problem, and consequently completed the following invention:
(1) A method for producing a cationic surface sizing agent containing a first step of obtaining a copolymer (A) by solution-polymerizing a monomer mixture which contains a monomer having a tertiary amino group (a) in the amount of 15 to 45% by weight, a (meth)acrylic acid ester (b) in the amount of 15 to 85% by weight, and styrenes (c) in the amount of 0 to 70% by weight in the presence of a chain transfer agent;
a second step of obtaining a copolymer (B) by polymerizing the copolymer (A) and a nonionic hydrophilic monomer (d);
a third step of obtaining a copolymer (C) by polymerizing the copolymer (B) and a hydrophobic monomer (e) in the absence of a surfactant; and
a fourth step of obtaining a quaternary ammonium salt of the copolymer (C) by quaternizing a tertiary amino group present in the copolymer (C).

(2) The method according to the above paragraph (1), wherein an ester moiety of the (meth)acrylic acid ester (b) is a chain-like alkyl having 4 to 18 carbon atoms, a cyclic alkyl having 4 to 18 carbon atoms, or aryl having 6 to 18 carbon atoms.
(3) The method according to the paragraph (1) or (2), wherein the nonionic hydrophilic monomer (d) is used so as to be 0.1 to 10% by weight with respect to the entire components inclusing the copolymer (C).
(4) The method according to any one of the paragraphs (1) to (3), wherein the copolymer (B) is used at the proportion of 30 to 70% by weight with respect to the entire components inclusing the copolymer (C), and the monomer having a tertiary amino group (a) is used so as to be 5 to 20% by weight with respect to the entire components inclusing the copolymer (C).
(5) The method according to any one of the paragraphs (1) to (4), wherein the polymerization in the second step is performed in an oxidation-reduction system using a water-soluble free-radical initiator and a heavy metal salt.
(6) The method according to the paragraph (5), wherein the water-soluble free-radical initiator is hydrogen peroxide, and the heavy metal salt is ferrous sulfate.
(7) The method according to any one of the paragraphs (1) to (6), wherein the tertiary amino group moiety present in the copolymer (A) is completely neutralized by using acid to be brought into the form of an aqueous solution in the first step.
(8) The method according to any one of the paragraphs (1) to (7), wherein the copolymer (A) has an average particle diameter of 50 nm or less.
(9) The method according to any one of the paragraphs (1) to (8), wherein the quaternary ammonium salt of the copolymer (C) has an average particle diameter of 100 nm or more.
(10) The method according to any one of the paragraphs (1) to (9), wherein 50 mol % or more of the tertiary amino group present in the copolymer (C) is quaternized.
(11) The method according to any one of the paragraphs (1) to (10), wherein the quaternization is performed by using epichlorohydrin.
(12) The method according to any one of the above paragraphs (1) to (11), wherein the monomer having a tertiary amino group (a) is at least one selected from the group consisting of dialkylaminoalkyl(meth)acrylate and dialkylaminoalkyl(meth)acrylamide.
(13) A cationic surface sizing agent produced by the method according to any one of the above paragraphs (1) to (12).
(14) A method for surface treating paper or a paper board, containing a step of coating the surface of the paper or paper board with the cationic surface sizing agent according to the paragraph (13) or a mixture of this sizing agent and a water-soluble high-molecular compound.
(15) Paper or a paper board prepared by the method according to the paragraph (14).
(16) The paper or paper board according to the paragraph (15), wherein the paper or paper board before coated with a cationic surface sizing agent is paper or a paper board not containing an internal sizing agent, a neutralized paper having a Stockigt sizing degree of 2 second or less and a pH of paper surface of 6.5 to 8.5, or a neutralized paper board having water absorbency by a two minutes Cobb test of 100 g/m$^2$ or more and a pH of paper surface of 6.5 to 8.5.

Effects of the Invention

In accordance with the present invention, the effect of enabling to provide a cationic surface sizing agent, which has excellent dispersion stability and imparts an excellent sizing property regardless of environment of usage, especially water conditions (hardness, pH, etc.) or paper types (paper, paper board, etc.) to which the sizing agent is applied, is achieved.

That is, by undergoing the first step to the third step to obtain a copolymer (C), the cationic surface sizing agent is hardly susceptible to the hardness of water to be used and the stability of the copolymer (C) can be improved. Further, by quaternizing a tertiary amino group present in the copolymer (C) to obtain a quaternary ammonium salt of the copolymer (C), the cationic surface sizing agent is further hardly susceptible to the hardness of water to be used. Moreover, the sizing agent is also hardly susceptible to a pH. Further, it is possible to attain a sizing agent having the effect that the surface sizing agent is uniformly dispersed without being agglomerated when it is diluted to a concentration of a coating solution. Accordingly, even when paper or a paper board not containing an internal sizing agent, a neutralized paper having a Stockigt sizing degree of 2 second or less, or a neutralized paper board having water absorbency by a two minutes Cobb test of 100 g/m$^2$ or more is coated with the surface sizing agent, the amount of the surface sizing agent, which is distributed over the surface of paper without being dispersed throughout the whole paper in the form of agglomerated molecules, is increased. It is thought that as a result of the above, the hydrophobicity of the surface sizing agent is adequately exerted on the surface of paper.

EMBODIMENTS OF THE INVENTION

A method for producing a cationic surface sizing agent of the present invention (hereinafter, sometimes referred to as merely "production method of the present invention") contains a first step of obtaining a copolymer (A) by solution-polymerizing a monomer mixture which contains a monomer having a tertiary amino group (a) in the amount of 15 to 45% by weight, a (meth)acrylic acid ester (b) in the amount of 15 to 85% by weight, and styrenes (c) in the amount of 0 to 70% by weight in the presence of a chain transfer agent;

a second step of obtaining a copolymer (B) by polymerizing the copolymer (A) and a nonionic hydrophilic monomer (d);

a third step of obtaining a copolymer (C) by polymerizing the copolymer (B) and a hydrophobic monomer (e) in the absence of a surfactant; and a fourth step of of obtaining a quaternary ammonium salt of the copolymer (C) by quaternizing a tertiary amino group present in the copolymer (C). Hereinafter, the present invention will be described in detail. In addition, in the present specification, "(meth)acrylic" means "acrylic" or "methacrylic", and "(meth)acrylate" means "acrylate" or "methacrylate".

<Method for Producing Cationic Surface Sizing Agent>
(First Step)

The first step is a step of obtaining a copolymer (A) by solution-polymerizing a monomer mixture containing a monomer having a tertiary amino group (a) (hereinafter, sometimes referred to as merely "component a"), a (meth) acrylic acid ester (b) (hereinafter, sometimes referred to as merely "component b") and styrenes (c) (hereinafter, sometimes referred to as merely "component c") in the specific ratio in the presence of a chain transfer agent.

The monomer having a tertiary amino group (component a) used in the production method of the present invention is not particularly limited as long as it is a monomer which has a tertiary amino group in a molecule and can be copolymerized with the (meth)acrylic acid ester (b) and the styrenes (c), respectively described later. Examples of such component a include dialkylaminoalkyl(meth)acrylate, dialkylaminoalkyl (meth)acrylamide and the like.

Examples of dialkylaminoalkyl(meth)acrylate include dimethylaminoethyl(meth)acrylate, dimethylaminopropyl (meth)acrylate, diethylaminoethyl(meth)acrylate, dimethylaminopropyl(meth)acrylate, diethylaminopropyl(meth) acrylate and the like.

Examples of dialkylaminoalkyl(meth)acrylamide include dimethylaminoethyl(meth)acrylamide, diethylaminoethyl (meth)acrylamide, dimethylaminopropyl(meth)acrylamide, diethylaminopropyl(meth)acrylamide and the like.

Among these components a, dimethylaminoethyl(meth) acrylate or dimethylaminopropyl(meth)acrylamide is preferable.

The component a is contained in the monomer mixture forming the copolymer (A) in the proportion of 15 to 45% by weight. When the proportion of the component a is less than 15% by weight, the hydrophilicity of the copolymer (A) is poor, and the copolymer (A) cannot be uniformly dispersed in water. On the other hand, when the proportion of the component a is more than 45% by weight, the hydrophobicity of the copolymer (A) is poor to cause the sizing property of the resulting sizing agent to be poor. The component a is contained preferably in the proportion of 18 to 40% by weight, and more preferably in the proportion of 20 to 35% by weight.

The components a may be used singly or may be used in combination of two or more thereof. When the components a are used in combination of two or more thereof, the total content of the combination is adapted to satisfy the above range.

The (meth)acrylic acid ester (component b) used in the production method of the present invention is not particularly limited as long as it is a monomer which can be copolymerized with the component a and the styrenes (c) described later.

As the component b, for example, the (meth)acrylic acid esters, an ester moiety of which is a chainlike alkyl having 4 to 18 carbon atoms, a cyclic alkyl having 4 to 18 carbon atoms, or aryl having 6 to 18 carbon atoms, are preferable. That is, the (meth)acrylic acid esters, in which R of $CH_2=CH-COOR$ or $CH_2=C(CH_3)-COOR$ is an alkyl group having 4 to 18 carbon atoms, a cyclic alkyl group having 4 to 18 carbon atoms, or an aryl group having 6 to 18 carbon atoms, are preferable.

Examples of such component b include isobutyl(meth) acrylate, n-butyl(meth)acrylate, ethylhexyl(meth)acrylate, lauryl(meth)acrylate, cetyl(meth)acrylate, stearyl(meth) acrylate, cyclohexyl(meth)acrylate, benzyl(meth)acrylate and the like. Among these, isobutyl(meth)acrylate, n-butyl (meth)acrylate, and ethylhexyl(meth)acrylate are preferable.

The component b is contained in the monomer mixture forming the copolymer (A) in the proportion of 15 to 85% by weight. When the proportion of the component b is less than 15% by weight, the sizing property of the resulting sizing agent is poor. On the other hand, when the proportion of the component b is more than 85% by weight, the hydrophilicity of the copolymer (A) is poor, and the copolymer (A) cannot be uniformly dispersed in water. The component b is contained preferably in the proportion of 20 to 80% by weight, and more preferably in the proportion of 40 to 80% by weight.

The components b may be used singly or may be used in combination of two or more thereof. When the components b are used in combination of two or more thereof, the total content of the combination is adapted to satisfy the above range.

The styrenes (component c) used in the production method of the present invention is not particularly limited as long as it is a monomer which can be copolymerized with the component a and the component b. Examples of the component c include styrene, α-methylstyrene, vinyl toluene, ethyl vinyl toluene, chloromethyl styrene and the like. Among these, styrene, α-methylstyrene and vinyl toluene are preferable.

The component c is contained in the monomer mixture forming the copolymer (A) in the proportion of 0 to 70% by weight. When the proportion of the component c is more than 70% by weight, the ability of the monomer to be copolymerized in a solution-polymerization is poor. When the ability of the monomer to be copolymerized is poor, an effective component in the surface sizing agent agglomerates to form micrograins which are scattered on the surface of paper and can only non-uniformly cover the paper, and therefore a sizing effect is reduced. The component c is contained preferably in the proportion of 0 to 50% by weight, and more preferably in the proportion of 0 to 40% by weight.

The components c may be used singly or may be used in combination of two or more thereof. When the components c are used in combination of two or more thereof, the total content of the combination is adapted to satisfy the above range.

Moreover, the monomer mixture may contain monomers other than the components a, b and c to such an extent that the effect of the present invention is not impaired. Examples of such monomers include compounds having a vinyl group or an allyl group such as short chain alkyl(meth)acrylates such as methyl(meth)acrylate, ethyl(meth)acrylate, n-propyl (meth)acrylate, isopropyl(meth)acrylate and the like; hydroxyl group-containing (meth)acrylates such as hydroxypropyl(meth)acrylate, 2-hydroxyethyl(meth)acrylate and the like; (meth)acrylamide; and acrylonitrile.

The copolymer (A) is obtained by solution-polymerizing a monomer mixture containing the above-mentioned components a, b and c in the presence of a chain transfer agent. The solution-polymerization of a monomer mixture is not particularly limited, and for example, it is performed by a usual radical polymerization.

A solvent used in solution-polymerization can be appropriately selected according to the composition of the monomer mixture. Examples of the solvent include isopropyl alcohol, n-butanol, isobutanol, t-butanol, sec-butanol, acetone, methyl ethyl ketone, methyl-n-propyl ketone, 3-methyl-2-butanol, diethyl ketone, methyl isopropyl ketone, methyl isobutyl ketone, diisopropyl ketone, ethyl benzene, toluene and the like. Among these, isopropyl alcohol, methyl isobutyl ketone, and toluene are preferably used.

The chain transfer agent is used for controlling a weight average molecular weight of the copolymer (A). Examples of the chain transfer agent include oil-soluble chain transfer agents (for example, mercaptans such as t-dodecylmercaptan, n-dodecyl mercaptan, n-octyl mercaptan, mercaptopropionic acid dodecyl ester and the like, cumene, carbon tetrachloride, α-methylstyrene dimer, terpinolene, etc.), and water-soluble chain transfer agents (for example, mercaptoethanol, thioglycolic acid and salt thereof, etc.). The chain transfer agent can be appropriately determined according to a solvent or the composition of a monomer mixture, and an amount of the chain transfer agent can be appropriately determined so as to obtain the copolymer (A) having a desired weight average molecular weight.

The polymerization initiator is not particularly limited, and examples thereof include azo type initiators (e.g., azobismethylbutyronitrile, dimethyl azobis isobutylate, azobisdimethylvaleronitrile, azobisisobutyronitrile, etc.), and peroxide type polymerization initiators (e.g., hydrogen peroxide, benzoyl persulfate, t-butyl peroxybenzoate, t-butyl peroxy isopropyl monocarbonate, t-butyl peroxy-2-ethyhexanoate, cumene hydroperoxide, etc.). An amount of the polymerization initiator is not particularly limited, and it can be appropriately determined according to the composition of a monomer mixture.

A temperature or a time of the polymerization reaction is not particularly limited, and it can be appropriately set according to a solvent, the composition of a monomer mixture and a polymerization initiator to be used. The polymerization reaction is usually carried out at a temperature of 80 to 120° C., preferably 85 to 115° C. Further, a reaction time is usually 2 to 6 hours, and preferably 3 to 5 hours.

The copolymer (A) thus obtained is preferably solubilized in water for subjecting it to a subsequent step. For example, it is preferred to completely neutralize the tertiary amino group moiety present in the copolymer (A) by using acid such as hydrochloric acid, sulfuric acid or acetic acid to bring the tertiary amino group moiety into the form of an aqueous solution. Moreover, the copolymer (A) preferably has an average particle diameter of 50 nm or less, and more preferably an average particle diameter of 30 nm or less.

(Second Step)

The second step is a step of obtaining a copolymer (B) by polymerizing the copolymer (A) and a nonionic hydrophilic monomer (d) (hereinafter, sometimes referred to as merely "component d").

The nonionic hydrophilic monomer (component d) used in the production method of the present invention is not particularly limited as long as it is a monomer which can be copolymerized with the copolymer (A). Examples of the component d include hydroxyl group-containing (meth)acrylates described above; amide group-containing (meth)acrylates such as (meth)acrylamide and the like; and N-vinyl monomers such as N-vinyl pyrolidone, N-vinyl formamide and the like.

The amounts of the copolymer (A) and the component d are not particularly limited, and the copolymer (A) is used preferably at the proportion of 85.7 to 99.7% by weight, and more preferably at the proportion of 90.0 to 99.0% by weight.

A polymerization reaction of the copolymer (A) with the component d is performed by radical polymerization described above. However, in the second step, the polymerization reaction is preferably performed by using an oxidation-reduction system using a water-soluble free-radical initiator and a heavy metal salt, namely, a redox catalyst. When the polymerization reaction is performed by using the oxidation-reduction system, namely, the redox catalyst, a homopolymer of the component d is hardly synthesized, and a graft copolymer (copolymer (B)) of the copolymer (A) and the component d, which is intended in the present invention, becomes easy to be synthesized. Accordingly, a sizing agent having excellent dispersibility and enabling to impart an excellent sizing property can be obtained.

Examples of the water-soluble free-radical initiator include peroxo compounds, azo compounds, hydrogen peroxide, persulfate and the like, and examples of the heavy metal salt include cerium, manganese, iron (II) and the like. Among these, a combination of hydrogen peroxide and ferrous sulfate is preferable.

A reaction temperature and a reaction time of the polymerization reaction in the second step are not particularly limited, and it can be appropriately set. The polymerization reaction is usually carried out at a temperature of 70 to 90° C., preferably 75 to 90° C. Further, the reaction time is usually 1 to 5 hours, and preferably 2 to 4 hours.

(Third Step)

The third step is a step of obtaining a copolymer (C) by polymerizing the copolymer (B) and a hydrophobic monomer (e) (hereinafter, sometimes referred to as merely "component e") in the absence of a surfactant.

The hydrophobic monomer (component e) used in the production method of the present invention is not particularly limited as long as it is a monomer which can be copolymerized with the copolymer (B). Examples of the component e include styrene, 2-ethylhexyl(meth)acrylate, methyl(meth)acrylate, n-butyl(meth)acrylate, isobutyl(meth)acrylate, t-butyl(meth)acrylate and the like.

The amounts of the copolymer (B) and the component e are not particularly limited, and the copolymer (A) is used preferably at the proportion of 30 to 70% by weight, and more preferably at the proportion of 40 to 70% by weight.

The polymerization reaction of the copolymer (A) with the component d, as described above, is performed by radical polymerization by use of an azo type initiator, a peroxide type polymerization initiator or the redox catalyst.

A reaction temperature and a reaction time of the polymerization reaction in the third step are not particularly limited, and it can be appropriately set. The polymerization reaction is usually carried out at a temperature of 70 to 90° C., preferably 75 to 90° C. Further, the reaction time is usually 1 to 5 hours, and preferably 2 to 4 hours.

The copolymer (C) thus obtained preferably contains the above component d in the amount of 0.1 to 10% by weight, more preferably in the amount of 0.4 to 7.0% by weight. Alternatively, the copolymer (C) preferably contains the copolymer (B) in the amount of 30 to 70% by weight, more preferably in the amount of 40 to 70% by weight, and contains the component a preferably in the amount of 5 to 20% by weight, and more preferably in the amount of 8 to 18% by weight.

A reactant in the third step is usually obtained in the form of emulsion of the copolymer (C). Further, since the surfactant is not used, a polymer which is composed of only the component e dispersed by the surfactant is hardly synthesized. Therefore, the sizing agent ultimately obtained does not contain the surfactant, and a further improvement in the effect of imparting a sizing property can be expected.

(Fourth Step)

The fourth step is a step of obtaining a quaternary ammonium salt of the copolymer (C) by quaternizing a tertiary amino group present in the copolymer (C).

The proportion of a tertiary amino group quaternized among the tertiary amino group present in the copolymer (C) is not particularly limited. Preferably, 50 mol % or more of the tertiary amino group is quaternized, and more preferably, 60 mol % or more of the tertiary amino group is quaternized.

The quaternization is usually performed by using a quaternizing agent such as epihalohydrin, for example, epichlorohydrin and epibromohydrin.

The quaternary ammonium salt of the copolymer (C) thus obtained preferably has an average particle diameter of 100 nm or more, and more preferably an average particle diameter of 100 to 300 nm.

<Cationic Surface Sizing Agent>

The cationic surface sizing agent of the present invention is obtained by undergoing the first step to the fourth step. The cationic surface sizing agent thus obtained can be uniformly applied onto the surface of paper without being agglomerated since it has excellent dispersion stability without being affected by environments, especially, hardness or a pH of water, at the time of applying the surface sizing agent to the paper or paper board. Accordingly, the cationic surface sizing agent of the present invention can impart an excellent sizing property to paper or a paper board.

The cationic surface sizing agent of the present invention may be used singly, or may be used in combination with a water-soluble high-molecular compound in the case of coating the surface of the paper or paper board. In the case of combination use, the water-soluble high-molecular compound and the cationic surface sizing agent of the present invention are preferably mixed in proportions of 500:1 to 1:1, more preferably 100:1 to 5:1 by weight. Examples of the water-soluble high-molecular compound include starches such as starch, enzyme-modified starch, thermochemically modified starch, oxidized starch, esterified starch, etherified starch (e.g., hydroxyethylated starch, etc.), cationated starch and the like; polyvinyl alcohols such as polyvinyl alcohol, completely saponified polyvinyl alcohol, partially saponified polyvinyl alcohol, carboxyl-modified polyvinyl alcohol, silanol-modified polyvinyl alcohol, cation-modified polyvinyl alcohol, terminal alkyl-modified polyvinyl alcohol and the like; polyacrylamides such as polyacrylamide, cationic polyacrylamide, anionic polyacrylamide, amphoteric polyacrylamide and the like; and cellulose derivatives such as carboxymethylcellulose, hydroxyethyl cellulose, methyl cellulose and the like.

The paper or paper board to be coated with the cationic surface sizing agent of the present invention is not particularly limited, and any paper or paper board can be coated with the cationic surface sizing agent of the present invention. Preferably, the surface of paper or a paper board not containing an internal sizing agent, a neutralized paper having a Stockigt sizing degree of 2 second or less and a pH of paper surface of 6.5 to 8.5, or a neutralized paper board having water absorbency by a two minutes Cobb test of 100 g/m² or more and a pH of paper surface of 6.5 to 8.5 is coated with the cationic surface sizing agent of the present invention.

Since the cationic surface sizing agent of the present invention can be applied without being affected by hardness or a pH of water, the cationic surface sizing agent is very useful. Moreover, the paper and paper board coated with the cationic surface sizing agent of the present invention has an excellent sizing property and are used in various fields.

EXAMPLES

Hereinafter, the present invention will be described specifically referring to examples and comparative examples, but the present invention is not limited to these examples.

Abbreviations illustrated in Synthesis Example, Example, Comparative Example and Table represent the following compounds.

DM: Dimethylaminoethyl methacrylate
St: Styrene
2EHA: 2-ethylhexyl acrylate
2EHMA: 2-ethylhexyl methacrylate
MMA: Methyl methacrylate
nBA: n-butyl acrylate
nBMA: n-butyl methacrylate
iBA: i-butyl acrylate
iBMA: i-butyl methacrylate
tBMA: t-butyl methacrylate
2HEA: 2-hydroxyethyl acrylate
N-VP: N-vinyl pyrolidone
AAm: Acrylamide
MAAm: Methacrylamide <Synthesis of Copolymer (A)>

Synthesis Example A1

Into a four-necked flask, dimethylaminoethyl methacrylate (DM) (30 parts by weight), n-butyl methacrylate (nBMA) (30 parts by weight), n-butyl acrylate (nBA) (5 parts by weight), styrene (St) (35 parts by weight), n-dodecyl mercaptan (0.7 parts by weight) as a chain transfer agent, and isopropyl alcohol (32 parts by weight) as a solvent were charged, and the resulting mixture was stirred. Then, the mixture was heated to about 85° C., and 2,2'-azobisisobutyronitrile (1 part by weight) was added as an initiator, and the resulting mixture was reacted at about 90° C. for 3 hours. Then, 90% by weight acetic acid (12.7 parts by weight) and water (300 parts by weight) were charged into the four-necked flask in order to neutralize a tertiary amino group moiety of the resulting copolymer and traces of remaining DM. Next, isopropyl alcohol was distilled away by heating distillation, and then contents were cooled and diluted with water so that a solid concentration was 27% by weight to obtain a copolymer (A1).

Synthesis Examples A2 to A9

Copolymers (A2) to (A9) were obtained by following the same procedure as in Synthesis Example A1 except for using the components illustrated in Table 1 in the proportions illustrated in Table 1, respectively. In addition, "DM neutralization percentage" described in the following table illustrates how far the tertiary amino group moiety of the obtained copolymer and the traces of remaining DM are neutralized. For example, when the DM neutralization percentage is 100 mol %, it means that these are completely neutralized.

TABLE 1

| | Component a (parts by weight) | Component b (parts by weight) | | Component c (parts by weight) | DM neutralization percentage (90% acetic acid (parts by weight)) | Average particle diameter | Copolymer (A) |
|---|---|---|---|---|---|---|---|
| Synthesis Example A1 | DM (30) | nBMA (30) | nBA (5) | St (35) | 100 mol % (12.7) | 30 nm or less | A1 |
| Synthesis Example A2 | DM (25) | nBMA (75) | | — | 100 mol % (10.6) | 30 nm or less | A2 |
| Synthesis Example A3 | DM (20) | nBMA (40) | tBMA (40) | — | 100 mol % (8.5) | 30 nm or less | A3 |
| Synthesis Example A4 | DM (20) | nBMA (40) | 2EHMA (5) | — | 100 mol % (8.5) | 30 nm or less | A4 |
| Synthesis Example | DM (50) | 2EHMA (20) | | St (30) | 100 mol % (21.2) | 30 nm or less | A5[*1] |

TABLE 1-continued

| | Component a (parts by weight) | Component b (parts by weight) | | Component c (parts by weight) | DM neutralization percentage (90% acetic acid (parts by weight)) | Average particle diameter | Copolymer (A) |
|---|---|---|---|---|---|---|---|
| Synthesis Example A5 | | | | | | | A5 |
| Synthesis Example A6 | DM (20) | nBMA (70) | tBMA (10) | — | 100 mol % (8.5) | 30 nm or less | A6 |
| Synthesis Example A7 | DM (25) | — | | St (75) | 100 mol % (10.6) | 70 nm | A7(*1) |
| Synthesis Example A8 | DM (20) | nBMA (50) | nBA (30) | — | 100 mol % (8.5) | 30 nm or less | A8 |
| Synthesis Example A9 | DM (30) | tBMA (30) | 2EHMA (10) | St (30) | 100 mol % (12.7) | 30 nm or less | A9 |

(*1)Copolymers (A5) and (A7) are copolymers except the copolymer (A) which is used in the present invention.

<Synthesis of Copolymer (B)>

Synthesis Examples B1

The copolymer (A1) obtained in Synthesis Example A1 (412.7 parts by weight) was heated to 75° C., an aqueous solution of ferrous sulfate (7.9 parts by weight) (concentration 1% by weight) was added, and 2-hydroxyethyl acrylate (2HEA) (3 parts by weight) and hydrogen peroxide solution (0.8 part by weight) (concentration 35% by weight) were added. Then, the resulting mixture was heated to about 80° C. to be reacted for 3 hours. After the reaction, the reactant was diluted with water so that a solid concentration was 25% by weight to obtain a copolymer (B1).

Synthesis Examples B2 to B8

Copolymers (B2) to (B8) were obtained by following the same procedure as in Synthesis Example B1 except for using the components illustrated in Table 2 in the proportions illustrated in Table 2, respectively. In addition, the polymerization initiators illustrated the following table are as follows.
I1: Hydrogen peroxide solution (concentration 35% by weight)
I2: Aqueous solution of ferrous sulfate (concentration 1% by weight)
I3: Aqueous solution of ascorbic acid (concentration 1% by weight)
I4: Hydrogen peroxide solution (concentration 8% by weight)
I5: 2,2'-azobis(2-methylpropiondiamine)dihydrochloride

TABLE 2

| | Copolymer (parts by weight) | Polymerization intiator (parts by weight) | | | Component d (parts by weight) | Co-polymer (B) |
|---|---|---|---|---|---|---|
| Synthesis Example B1 | A1 (412.7) | I1 (0.8) | I2 (7.9) | — | 2HEA (3) | B1 |
| Synthesis Example B2 | A2 (410.6) | I1 (1.9) | I2 (5.2) | — | AAm (7) | B2 |
| Synthesis Example B3 | A3 (408.5) | I1 (1.4) | I2 (3.5) | I3 (2.8) | N-VP (5) | B3 |
| Synthesis Example B4 | A4 (408.5) | I1 (1.4) | I2 (5.2) | — | MAAm (5) | B4 |
| Synthesis Example B5 | A5 (421.2) | I1 (0.8) | I2 (7.9) | — | N-VP (3) | B5(*1) |
| Synthesis Example B6 | A6 (408.5) | I1 (1.9) | I2 (0.3) | — | AAm (7) | B6 |
| Synthesis Example B7 | A7 (410.6) | I1 (0.8) | I2 (5.2) | — | 2HEA (3) | B7(*1) |
| Synthesis Example B8 | A8 (412.7) | I1 (4.8) | I2 (7.9) | — | MAAm (25) | B8 |

(*1)Copolymers (B5) and (B7) are copolymers except the copolymer (B) which is used in the present invention.

<Synthesis of Cationic Surface Sizing Agent>

Example 1

An aqueous solution of the copolymer (B1) obtained in Synthesis Example B1 (400 parts by weight) (solid concentration 25% by weight) and water were charged into a four-necked flask and heated to about 85° C. Then, methyl methacrylate (MMA) (15 parts by weight), n-butyl methacrylate (nBMA) (45 parts by weight), 2-ethylhexyl acrylate (2EHA) (20 parts by weight), styrene (St) (70 parts by weight) as hydrophobic monomers, and hydrogen peroxide solution (56 parts by weight) (concentration 8% by weight) were charged into a four-necked flask, and the resulting mixture was reacted at about 85° C. for 3 hours. After the reaction, epichlorohydrin (10.7 parts by weight) was added to contents of the four-necked flask, and the resulting mixture was reacted at about 85° C. for 3 hours and diluted with water so that a solid concentration was 30% by weight to obtain a sizing agent.

Examples 2 to 4 and Comparative Examples 1 to 5

Sizing agents were obtained by following the same procedure as in Example 1 except for using the components illustrated in Table 3 in the proportions illustrated in Table 3, respectively.

TABLE 3

| | Copolymer (parts by weight) | Water (parts by weight) | DM neutralization percentage (90% acetic acid (parts by weight)) | Surfactant (parts by weight) | Component e (parts by weight) | | | |
|---|---|---|---|---|---|---|---|---|
| Example 1 | B1 (400) | 300 | — | — | MMA (15) | nBMA (45) | 2EHA (20) | St (70) |
| Example 2 | B2 (400) | 150 | 100 mol % (9.1) | — | nBMA (32) | nBA (32) | — | St (36) |
| Example 3 | B3 (400) | 100 | — | — | tBMA (20) | 2EHA (13) | iBA (13) | St (20) |
| Example 4 | B4 (400) | 150 | 50 mol % (7.6) | — | tBMA (8) | 2EHA (32) | iBA (20) | St (40) |
| Comparative Example 1 | B5 (400) | 300 | — | — | tBMA (40) | 2EHMA (35) | 2EHA (35) | St (40) |
| Comparative Example 2 | B6 (400) | 100 | — | (*1) (3.3) | nBMA (23) | 2EHMA (20) | — | St (23) |
| Comparative Example 3 | B7 (400) | 150 | 100 mol % (9.4) | — | | 2EHMA (56) | | St (44) |
| Comparative Example 4 | B8 (400) | 300 | — | — | nBMA (30) | 2EHMA (30) | nBA (40) | St (50) |
| Comparative Example 5 | A9 (400) | 300 | — | — | nBMA (50) | nBA (50) | — | St (50) |

| | Polymerization initiator (parts by weight) | | | Quaternization percentage ECH (*3) (parts by weight) | Amount of Copolymer (B) in Copolymer (C) (% by weight) | Amount of Component a in Copolymer (C) (% by weight) |
|---|---|---|---|---|---|---|
| Example 1 | I4 (56) | | | 60 mol % (10.7) | 40 | 12 |
| Example 2 | I4 (38) | | | 80 mol % (11.9) | 50 | 12.5 |
| Example 3 | I4 (25) | | | 100 mol % (11.9) | 60 | 12 |
| Example 4 | I4 (38) | | | 90 mol % (11.9) | 50 | 10 |
| Comparative Example 1 | I4 (56) | | | 80 mol % (23.8) | 40 | 20 |
| Comparative Example 2 | I5 (0.7) | | | 90 mol % (10.7) | 60 | 12 |
| Comparative Example 3 | I4 (38) | | | — | 50 | 12.5 |
| Comparative Example 4 | I4 (56) | | | 70 mol % (8.3) | 40 | 8 |
| Comparative Example 5 | I4 (56) | I2 (7.9) | I3 (6.2) | 50 mol % (8.9) | 40(*2) | 12 |

(*1): Cetyltrimethyl ammonium chloride
(*2)Amount of Copoymer (A) in Copolymer (C)
(*3): ECH indicates epichlorohydrin.

Comparative Example 6

Into a four-necked flask, dimethylaminoethyl methacrylate (DM) (20 parts by weight), n-butyl methacrylate (nBMA) (30 parts by weight), 2-ethylhexyl methacrylate (2EHMA) (20 parts by weight), styrene (St) (30 parts by weight), n-dodecyl mercaptan (0.7 part by weight) as a chain transfer agent, and isopropyl alcohol (32 parts by weight) as a solvent were charged, and the resulting mixture was stirred. Then, the mixture was heated to about 85° C., and 1 part by weight of 2,2'-azobisisobutyronitrile was added as an initiator, and the resulting mixture was reacted at about 90° C. for 3 hours. Then, 90% by weight acetic acid (8.5 parts by weight) and water (300 parts by weight) were charged into the four-necked flask in order to neutralize a tertiary amino group moiety of the resulting copolymer and traces of remaining DM. Then, isopropyl alcohol was distilled away by heating distillation. After the distillation of isopropyl alcohol, epichlorohydrin (7.1 parts by weight) was added, and the resulting mixture was reacted at 85° C. for 3 hours. Next, polyvinyl alcohol (9 parts by weight) (a degree of polymerization: about 2000, a degree of saponification: 99 to 100 mol %) was added. After a lapse of one hour from the addition of polyvinyl alcohol, the reactant was cooled and diluted with water so that a solid concentration was 20% by weight to obtain a sizing agent. A neutralization percentage of the tertiary amino group moiety of the copolymer and the traces of remaining DM was 100 mol %, and a quaternization percentage of the obtained sizing agent (copolymer) was 60 mol % and an average particle diameter of the sizing agent was 30 nm or less.

Comparative Example 7

Into a four-necked flask, dimethylaminoethyl methacrylate (DM) (25 parts by weight), isobutyl methacrylate (iBMA) (35 parts by weight), 2-ethylhexyl methacrylate (2EHMA) (5 parts by weight), styrene (St) (35 parts by weight), n-dodecyl mercaptan (0.7 part by weight) as a chain transfer agent, and isopropyl alcohol (32 parts by weight) as a solvent were charged, and the resulting mixture was stirred. Then, the mixture was heated to about 85° C., and 2,2'-azobisisobutyronitrile (1 part by weight) was added as an initiator, and the resulting mixture was reacted at about 90° C. for 3 hours.

Next, 90% by weight acetic acid (10.6 parts by weight) and water (300 parts by weight) were charged into the four-necked flask in order to neutralize a tertiary amino group moiety of the resulting copolymer and traces of remaining DM. Then, isopropyl alcohol was distilled away by heating distillation. After the distillation of isopropyl alcohol, epichlorohydrin (14.8 parts by weight) was added, and the resulting mixture was reacted at 85° C. for 3 hours. Then, the reactant was cooled and diluted with water so that a solid concentration was 25% by weight to obtain a sizing agent. A neutralization percentage of the tertiary amino group moiety of the copolymer and the traces of remaining DM was 100 mol %, and a quaternization percentage of the obtained sizing agent (copolymer) was 100 mol % and an average particle diameter of the sizing agent was 30 nm or less.

A sizing property (Stockigt sizing degree and water absorbency by a two minutes Cobb test) and a foaming property of the sizing agents obtained in Examples and Comparative Examples were evaluated according to the following method. The results of evaluations are illustrated in Table 4.

<Stockigt Sizing Degree>

Each of the sizing agents obtained in examples and comparative examples, oxidized starch, and tap water having hardness of 60 ppm (in terms of $CaCO_3$) were mixed so as to be 0.4% by weight, 5.0% by weight, and 94.6% by weight, respectively, to prepare a coating solution. Next, the obtained coating solution was applied onto both surfaces of a neutralized high-quality base paper (basis weight 70 g/m², Stockigt sizing degree 0 second, pH of paper surface 7.6) not having an internal sizing agent added in such a way that the amounts of the solution absorbed at both surfaces were respectively 30 g/m². Then, the coating solution was dried at 90° C. for 90 seconds using a rotary drum dryer (manufactured by KUMAGAI RIKI KOGYO CO., LTD., KRK rotary dryer) to obtain a coated paper.

Aside from this, when each of the above-mentioned coating solutions was prepared, synthesized hard water with hardness of 2000 ppm (in terms of $CaCO_3$) was added so that the hardness of a coating solution becomes 500 ppm to obtain a coating solution with high hardness. The coating solution with high hardness was applied to a neutralized high-quality base paper by the same procedure as in the above to obtain a coated paper.

The Stockigt sizing degree of each coated paper obtained was measured according to JIS P 8122.

<Water Absorbency by Two Minutes Cobb Test>

Each of the sizing agents obtained in examples and comparative examples, and tap water having hardness of 60 ppm (in terms of $CaCO_3$) were mixed so as to be 0.2% by weight and 99.8% by weight, respectively, to prepare a coating solution. Next, the obtained coating solution was applied onto one surface of a base paper for a liner (basis weight: 180 g/m², water absorbency by a two minutes Cobb test: 210 g/m², pH of paper surface: 7.2) having an internal sizing agent added in such a way that the amount of the solution absorbed at one surface was 15 g/m². Then, the coating solution was dried at 90° C. for 90 seconds using the above-mentioned rotary drum dryer to obtain a coated paper.

Aside from this, when each of the above-mentioned coating solutions was prepared, synthesized hard water with hardness of 2000 ppm (in terms of $CaCO_3$) was added so that the hardness of a coating solution becomes 500 ppm to obtain a coating solution with high hardness. The coating solution with high hardness was applied to a neutralized high-quality base paper by the same procedure as in the above to obtain a coated paper.

The water absorbency by a two minutes Cobb test of each coated paper obtained was measured according to JIS P 8140.

<Foaming Property>

The coating solution and the coating solution with high hardness used in the evaluation of the Stockigt sizing degree was put in a mixer for domestic use (manufactured by Panasonic Corporation, a fiber mixer), and stirred for 3 minutes. A height of a foam was measured after a lapse of three minutes from a stop of stirring.

<Stability Test>

The coating solution using the tap water and the coating solution using the synthesized hard water, which were used for the above-mentioned evaluation of a foaming property, were separated by filtration with a 200 mesh metal gauze after the test of a foaming property, and stability was evaluated from the weight of a residue in filtration. The case where the amount of a residue is smaller shows that the amount of an agglomerated substance is smaller, and the sizing agent has excellent dispersion stability.

TABLE 4

| | Stockigt sizing degree (seconds) | | Two minutes Cobb test (g/m²) | | Foaming property (mm) | | Stability test (g) | |
| --- | --- | --- | --- | --- | --- | --- | --- | --- |
| | Tap water | Synthesized hard water | Tap water | Synthesized hard water | Tap water | Synthesized hard water | Tap water | Synthesized hard water |
| Example 1 | 20 | 18 | 56 | 67 | 20 | 22 | Less than 0.01 | Less than 0.01 |
| Example 2 | 22 | 20 | 51 | 70 | 22 | 23 | Less than 0.01 | Less than 0.01 |
| Example 3 | 20 | 20 | 49 | 65 | 20 | 21 | Less than 0.01 | Less than 0.01 |
| Example 4 | 18 | 18 | 62 | 75 | 18 | 21 | Less than 0.01 | Less than 0.01 |
| Comparative Example 1 | 17 | 15 | 70 | 82 | 32 | 37 | 0.03 | 0.05 |
| Comparative Example 2 | 23 | 12 | 59 | 123 | 22 | 32 | 0.04 | 0.11 |
| Comparative Example 3 | 5 | 2 | 138 | 172 | 28 | 36 | 0.07 | 0.30 |
| Comparative Example 4 | 6 | 5 | 118 | 153 | 25 | 35 | 0.19 | 0.20 |
| Comparative Example 5 | 18 | 14 | 70 | 85 | 22 | 33 | 0.02 | 0.03 |

TABLE 4-continued

|  | Stockigt sizing degree (seconds) | | Two minutes Cobb test (g/m²) | | Foaming property (mm) | | Stability test (g) | |
| --- | --- | --- | --- | --- | --- | --- | --- | --- |
|  | Tap water | Synthesized hard water | Tap water | Synthesized hard water | Tap water | Synthesized hard water | Tap water | Synthesized hard water |
| Comparative Example 6 | 10 | 2 | 112 | 178 | 26 | 35 | 0.17 | 0.32 |
| Comparative Example 7 | 22 | 10 | 61 | 148 | 21 | 30 | 0.16 | 0.34 |

Hardness of tap water is 60 ppm (in terms of CaCO₃).

As illustrated in Table 4, the paper coated with the cationic surface sizing agent prepared by the production method of the present invention is found to have an excellent sizing property which compares favorably with the case using tap water even when using the synthesized hard water, and to have low water absorbency by a two minutes Cobb test to hardly absorb water. Moreover, it is found that the cationic surface sizing agent prepared by the production method of the present invention exhibits a low foaming property in any of use of tap water and use of synthesized hard water, and the sizing agent is excellent in the workability of coating. Further, it is found that the amount of a residue in filtration is small even when any of tap water and synthesized hard water is used, and stability (dispersion stability) in the coating solution is excellent.

On the other hand, the paper coated with the cationic surface sizing agent prepared by the method other than the production method of the present invention is found to have relatively a low sizing degree. Further, it is found that even when this paper has a relatively good sizing property (Comparative Examples 2 and 7), the sizing degree is reduced to about one-half in the case of using synthesized hard water. Further, it is found that this paper has relatively high water absorbency by a two minutes Cobb test and extremely tends to absorb water particularly when synthesized hard water is used. Furthermore, this surface sizing agent is found to extremely tend to foam when synthesized hard water is used. Further, it is found that the amount of a residue in filtration is large in any of use of tap water and use of synthesized hard water, and stability (dispersion stability) in the coating solution is low.

The invention claimed is:

1. A method for producing a cationic surface sizing agent comprising a first step of obtaining a copolymer (A) by solution-polymerizing a monomer mixture which comprises a monomer having a tertiary amino group (a) in the amount of 15 to 45% by weight, a (meth)acrylic acid ester (b) in the amount of 15 to 85% by weight, and styrenes (c) in the amount of 0 to 70% by weight in the presence of a chain transfer agent;
    a second step of obtaining a copolymer (B) by polymerizing the copolymer (A) and a nonionic hydrophilic monomer (d);
    a third step of obtaining a copolymer (C) by polymerizing the copolymer (B) and a hydrophobic monomer (e) in the absence of a surfactant; and
    a fourth step of obtaining a quaternary ammonium salt of the copolymer (C) by quaternizing a tertiary amino group present in the copolymer (C).

2. The method according to claim 1, wherein an ester moiety of the (meth)acrylic acid ester (b) is a chainlike alkyl having 4 to 18 carbon atoms, a cyclic alkyl having 4 to 18 carbon atoms, or aryl having 6 to 18 carbon atoms.

3. The method according to claim 1, wherein the nonionic hydrophilic monomer (d) is used so as to be 0.1 to 10% by weight with respect to the entire components inclusing the copolymer (C).

4. The method according to claim 1, wherein the copolymer (B) is used at the proportion of 30 to 70% by weight with respect to the entire components including the copolymer (C), and the monomer having a tertiary amino group (a) is used so as to be 5 to 20% by weight with respect to the entire components including the copolymer (C).

5. The method according to claim 1, wherein the polymerization in the second step is performed in an oxidation-reduction system using a water-soluble free-radical initiator and a heavy metal salt.

6. The method according to claim 5, wherein the water-soluble free-radical initiator is hydrogen peroxide, and the heavy metal salt is ferrous sulfate.

7. The method according to claim 1, wherein the tertiary amino group moiety present in the copolymer (A) is completely neutralized by using acid to be brought into the form of an aqueous solution in the first step.

8. The method according to claim 1, wherein the copolymer (A) has an average particle diameter of 50 nm or less.

9. The method according to claim 1, wherein the quaternary ammonium salt of the copolymer (C) has an average particle diameter of 100 nm or more.

10. The method according to claim 1, wherein 50 mol % or more of the tertiary amino group present in the copolymer (C) is quaternized.

11. The method according to claim 1, wherein the quaternization is performed by using epichlorohydrin.

12. The method according to claim 1, wherein the monomer having a tertiary amino group (a) is at least one selected from the group consisting of dialkylaminoalkyl(meth)acrylate and dialkylaminoalkyl(meth)acrylamide.

13. A cationic surface sizing agent produced by the method according to claim 1.

14. A method for surface treating paper or a paper board, comprising a step of coating the surface of the paper or paper board with the cationic surface sizing agent according to claim 13 or a mixture of this sizing agent and a water-soluble high-molecular compound.

15. Paper or a paper board prepared by the method according to claim 14.

16. The paper or paper board according to claim 15, wherein the paper or paper board before coated with a cationic surface sizing agent is paper or a paper board not containing an internal sizing agent, a neutralized paper having a Stockigt sizing degree of 2 second or less and a pH of paper surface of 6.5 to 8.5, or a neutralized paper board having water absorbency by a two minutes Cobb test of 100 g/m² or more and a pH of paper surface of 6.5 to 8.5.

* * * * *